UNITED STATES PATENT OFFICE.

ADOLF JOLLES, OF VIENNA, AUSTRIA-HUNGARY.

PROCESS OF MAKING FERRUGINOUS NUCLEIN.

SPECIFICATION forming part of Letters Patent No. 641,017, dated January 9, 1900.

Application filed November 18, 1899. Serial No. 737,519. (No specimens.)

*To all whom it may concern:*

Be it known that I, ADOLF JOLLES, a subject of the Emperor of Austria-Hungary, residing at Vienna, in the Province of Lower Austria, in the Empire of Austria-Hungary, have invented certain new and useful Improvements in the Manufacture of Ferruginous Nuclein Compounds from Blood; and I do hereby declare the following to be a full, clear, and exact description of the invention, such as will enable others skilled in the art to which it appertains to make and use the same.

As is known, iron preparations prepared from blood are best suited for the therapeutical application of iron, as by means of such preparations the greatest quantities of assimilable iron can be introduced in the organism. A large proportion of the blood preparations of iron employed up to the present time, however, do not fulfil the requirements of a rational iron therapy, because they are, on the one hand, digested with difficulty or can only be absorbed to a limited extent, and because, on the other hand, they contain bodies such as the regressive products of the blood—such as urea, uric acid, creatin, xanthin, &c.—that only constitute useless incumbrances of iron therapy.

My present invention relates to the production of a ferruginous nuclein compound from blood applicable for therapeutical purposes which is free from the above-mentioned disadvantages.

In carrying out the said invention blood, preferably that of oxen or pigs, is mixed with about ten times its volume of a common-salt solution of from eight to ten per cent. strength and the mixture is allowed to stand for some days in a cool place until all the blood-corpuscles have been deposited at the bottom. The liquid standing above the mass of blood-corpuscles is then decanted, and the remaining mass of blood-corpuscles is then introduced into a suitable shaking apparatus and is there shaken up, together with about an equal volume of water, in which the coloring-matter of the blood dissolves, or preferably with a mixture of about equal parts of water and ether, in order to remove certain substances—such as lecithin, &c.—that are soluble in ether. Upon then allowing the mixture to stand for some hours it will completely separate into a layer of ether and one of water, of which the latter is allowed to flow off into a suitable vessel, and is then mixed with about the same volume of a ten-per-cent. mineral-acid solution, preferably hydrochloric acid, or it may be a suitably-concentrated organic acid. When ether is not made use of in the above treatment, the aqueous blood solution is treated in the same way as above. After careful stirring of the acid mixture thus obtained it is left to stand for some time.

The degree of concentration of the acid employed is of considerable importance for the effectual carrying out of the process, as if the acid is too dilute only a separation of the hæmatin contained in the hæmoglobin or blood coloring-matter from the globulin-like proteids contained in the coloring-matter is effected thereby, while mineral acids whose concentration is not materially below the limit indicated produce a more deeply-seated decomposition, which is shown by the fact that when the acid is added to the hæmoglobin solution a precipitate of a brownish-yellow color is formed which no longer yields the hæmin crystals which are characteristic of hæmatin, but contains all the iron organically combined in the form of an albumin-like compound. The said brownish-yellow precipitate obtained in the above-described manner by the addition of hydrochloric acid to the hæmoglobin solution is now separated by filtration, washed with absolute alcohol, and, lastly, dried in partial *vacuo* over soda lime at a temperature of about 60° to 70° centigrade. A sample of the dried substance must no longer show a reaction for chlorine.

For accelerating the drying process *in vacuo* it is advantageous to spread the precipitate in thin layers on porous earthenware plates. After drying the substance is disintegrated and can then be at once made use of both by itself, as also mixed with flavoring materials, whether in solid form—such as chocolate, cocoa, sugar, &c., in which case the mixture is suitably formed into pills or tabloids of any required dosage—or the materials may be in liquid form, such as wine, alcohol, milk, &c.

The preparation formed out of blood in the above-described manner constitutes a powder of slightly-bitter flavor which is soluble in water and alcohol. It contains phosphorus and iron, the latter amounting on the average to about 0.32 per cent. It has a slightly-acid reaction and can therefore be combined with medicaments of a basic character.

As compared with other similar preparations the new compound possesses the characteristic that it will dissolve in hot liquids without curdling.

A further difference consists in that the new compound is not affected by the hydrochloric acid of the stomach and therefore passes undecomposed into the intestinal ducts for absorption. It contains the iron in the form of an absorbable organic compound and is entirely free from the regressive products, such as urea, uric acid, creatin, xanthin, and the like.

I claim.

1. The process of making ferruginous nuclein, which consists in separating the blood-corpuscles from blood, treating the same with water, treating the resulting solution with dilute acid and washing and drying the resulting precipitate, whereby the resulting slightly-acid product of slightly-bitter taste, soluble in water and alcohol, containing phosphorus and iron and dissolving in hot liquids without curdling is obtained, substantially as set forth.

2. The process of making ferruginous nuclein, which consists in digesting blood with an aqueous solution of sodium chloride, treating the solid residue with a solution of ether and water to remove the coloring-matter of the blood, separating the aqueous solution, and treating the same with a dilute acid, and washing and drying the resulting precipitate, whereby a slightly-acid product of slightly-bitter taste, soluble in water and alcohol, containing phosphorus and iron, and dissolving in hot liquids without curdling is obtained, substantially as set forth.

3. The process of making ferruginous nuclein, which consists in digesting blood with an aqueous solution of sodium chloride, treating the solid residue with a solution of ether and water to remove the coloring-matter of the blood, separating the aqueous solution, and treating the same with a dilute mineral acid, and washing and drying the resulting precipitate, whereby a slightly-acid product of slightly-bitter taste, soluble in water and alcohol, containing phosphorus and iron, and dissolving in hot liquids without curdling is obtained, substantially as set forth.

4. The process of making ferruginous nuclein, which consists in digesting blood with an aqueous solution of sodium chloride, treating the solid residue with a solution of ether and water to remove the coloring-matter of the blood, separating the aqueous solution, and treating the same with dilute hydrochloric acid, and washing and drying the resulting precipitate, whereby a slightly-acid product of slightly-bitter taste, soluble in water and alcohol, containing phosphorus and iron, and dissolving in hot liquids without curdling is obtained, substantially as set forth.

5. The process of making ferruginous nuclein, which consists in digesting blood with a solution of sodium chloride of approximately ten-per-cent. strength, treating the residues with a mixture of equal parts water and ether, separating the resulting aqueous solution and treating the same with a solution of hydrochloric acid, approximately ten-per-cent. concentration, and washing and drying the resulting precipitate, whereby a slightly-acid product of slightly-bitter taste, soluble in water and alcohol, containing phosphorus and iron and dissolving in hot liquids without curdling is obtained, substantially as set forth.

6. The process of making ferruginous nuclein, which consists in digesting blood with a solution of sodium chloride of approximately ten-per-cent. strength, treating the residue with a mixture of equal parts water and ether, separating the resulting aqueous solution and treating the same with an equal volume of a solution of hydrochloric acid, approximately ten-per-cent. concentration, and washing with absolute alcohol, and drying the resulting precipitate, whereby a slightly-acid product of slightly-bitter taste, soluble in water and alcohol, containing phosphorus and iron and dissolving in hot liquids is obtained, substantially as set forth.

In testimony that I claim the foregoing as my invention I have signed my name in presence of two subscribing witnesses.

ADOLF JOLLES.

Witnesses:
ALVESTO S. HOGUE,
AUGUST FUGGER.